US011626622B2

(12) United States Patent
Oura

(10) Patent No.: US 11,626,622 B2
(45) Date of Patent: Apr. 11, 2023

(54) METHOD FOR PRODUCING ALL SOLID STATE BATTERY AND ALL SOLID STATE BATTERY

(71) Applicant: Toyota Jidosha Kabushiki Kaisha, Toyota (JP)

(72) Inventor: Kei Oura, Toyota (JP)

(73) Assignee: TOYOTA JIDOSHA KABUSHIKI KAISHA, Toyota (JP)

(\*) Notice: Subject to any disclaimer, the term of this patent is extended or adjusted under 35 U.S.C. 154(b) by 214 days.

(21) Appl. No.: 17/091,687

(22) Filed: Nov. 6, 2020

(65) Prior Publication Data

US 2021/0143482 A1 May 13, 2021

(30) Foreign Application Priority Data

Nov. 13, 2019 (JP) .............................. JP2019-205409

(51) Int. Cl.
*H01M 10/0585* (2010.01)
*H01M 4/62* (2006.01)
*H01M 4/04* (2006.01)
*H01M 10/0562* (2010.01)
*H01M 10/0525* (2010.01)

(52) U.S. Cl.
CPC ..... *H01M 10/0585* (2013.01); *H01M 4/0404* (2013.01); *H01M 4/621* (2013.01); *H01M 10/0562* (2013.01); *H01M 10/0525* (2013.01)

(58) Field of Classification Search
CPC .. H01M 10/0562; H01M 4/04; H01M 4/0407; H01M 4/0402
See application file for complete search history.

(56) References Cited

U.S. PATENT DOCUMENTS

| 2017/0098857 | A1* | 4/2017 | Carlson ............... H01M 50/434 |
| 2017/0141423 | A1* | 5/2017 | Okada ..................... B32B 37/12 |
| 2018/0226681 | A1  | 8/2018 | Hasegawa et al. |
| 2019/0181432 | A1* | 6/2019 | Yui .................. H01M 10/0585 |
| 2021/0389382 | A1* | 12/2021 | Kawakami .......... H01M 10/482 |

FOREIGN PATENT DOCUMENTS

| JP | H10270013 A | 10/1998 |
| JP | 2013-171643 A | 9/2013 |
| JP | 2014-107182 A | 6/2014 |
| JP | 2015-103433 A | 6/2015 |
| JP | 2018-125260 A | 8/2018 |
| JP | 2018-190537 A | 11/2018 |
| JP | 2019-140024 A | 8/2019 |

\* cited by examiner

*Primary Examiner* — Matthew J Merkling
(74) *Attorney, Agent, or Firm* — Dinsmore & Shohl LLP

(57) ABSTRACT

A method for producing an all solid state battery including a first current collector, a first active material layer, a solid electrolyte layer, a second active material layer and a second current collector stacked in this order, the method comprising: a transferring step of transferring a transfer layer onto the first current collector by using a transfer member including a transfer foil and the transfer layer, the transferring step being included in a step of forming at least one layer of the first active material layer, the solid electrolyte layer, and the second active material layer, and the transfer layer includes a binder, and in a thickness direction, a binder concentration of a surface portion on opposite side to the transfer foil is higher than a binder concentration of a surface portion on the transfer foil side.

5 Claims, 3 Drawing Sheets

METHOD FOR PRODUCING ALL SOLID STATE BATTERY AND ALL SOLID STATE BATTERY

CROSS-REFERENCE TO RELATED APPLICATIONS

This nonprovisional application claims priority to Japanese Patent Application No. 2019-205409 filed on Nov. 13, 2019, with the Japan Patent Office, the entire contents of which are hereby incorporated by reference.

TECHNICAL FIELD

The present disclosure relates to a method for producing an all solid state battery with improved transfer efficiency and an all solid state battery.

BACKGROUND ART

An all solid state battery is a battery including a solid electrolyte layer between a cathode layer and an anode layer, and, compared to a liquid battery having a liquid electrolyte including a flammable organic solvent, it is easier to simplify the safeguard thereof.

Although it is not an all solid state battery technology, Japanese Patent Application Laid-Open (JP-A) No. H10-270013 discloses an electrode for a non-aqueous electrolyte secondary battery comprising an electrode mixture layer formed by stacking an electrode mixture paste, prepared by mixing and kneading an electrode raw material powder with a binder and a solvent, on a current collector, wherein the binder concentration in the electrode mixture layer is high in the vicinity of the current collector. Similarly, although it is not an all solid state battery technology, JP-A 2014-107182 discloses a lithium ion secondary battery including a current collector foil as a current collector and an electrode film formed by stacking a plurality of electrode film layers including a binder adhered to the current collector foil, on the surface of the current collector foil, and the electrode film layer includes a layer whose binder concentration on the current collector foil side is higher than the binder concentration on the opposite side to the current collector foil.

Also, JP-A 2015-103433 discloses a winding type all solid state battery obtained by winding a stacked body including a cathode layer, an anode layer and a solid electrolyte layer formed between the cathode layer and the anode layer, the binder concentrations of the solid electrolyte layer differ in the winding direction thereof.

Also, JP-A 2013-171643 discloses a lithium ion battery including a collector from which generated electricity is taken out and an electrode film adhered on the surface of the collector by a binder, and a ratio between binder concentration on the collector side of the electrode film and binder concentration of the opposite side to the collector is in a range of 0.5 to 2.

SUMMARY OF DISCLOSURE

Technical Problem

In a method for producing an all solid state battery, a method for producing wherein at least one layer of a cathode active material layer, a solid electrolyte layer, and an anode active material layer is formed by using a transfer method, is known. In the method for producing an all solid state battery using the transfer method, an improvement of the transfer efficiency has been demanded. The present disclosure has been made in view of the above circumstances, and a main object is to provide a method for producing an all solid state battery with an improved transfer efficiency.

Solution to Problem

In order to achieve the object, provided is a method for producing an all solid state battery including a first current collector, a first active material layer, a solid electrolyte layer, a second active material layer and a second current collector stacked in this order, the method comprising: a transferring step of transferring a transfer layer onto the first current collector by using a transfer member including a transfer foil and the transfer layer, the transferring step being included in a step of forming at least one layer of the first active material layer, the solid electrolyte layer, and the second active material layer, and the transfer layer includes a binder, and in a thickness direction, a binder concentration of a surface portion on opposite side to the transfer foil is higher than a binder concentration of a surface portion on the transfer foil side.

According to the present disclosure, by using the transfer layer, a transfer failure may be suppressed since the surface portion of the transfer layer with high binder concentration may be disposed on the first current collector, when transferring. Thereby, a method for producing an all solid state battery with improved transfer efficiency may be provided.

In the disclosure, in the transferring step, the transfer layer may be transferred onto a transfer receiving layer formed on the first current collector, the transfer receiving layer may include a binder, and in a thickness direction, a binder concentration of a surface portion on opposite side to the first current collector may be higher than a binder concentration of a surface portion on the first current collector side.

In the disclosure, the transfer receiving layer may be the first active material layer, and the transfer layer may be a layer including the solid electrolyte layer as an outermost layer.

In the disclosure, the first active material layer may be a stacked body including at least two layers or more of active material constituting layers, the transfer receiving layer may be a $n^{th}$ active material constituting layer wherein n is an integer of one or more, and the transfer layer may be a $(n+1)^{th}$ active material constituting layer.

In the disclosure, in a thickness direction of the transfer layer, when a region from a midportion to a surface portion on the transfer foil side is regarded as a first region and a region from the midportion to a surface portion on opposite side to the transfer foil is regarded as a second region, a proportion of a binder concentration of the second region to a binder concentration of the first region may be in a predetermined range.

The present disclosure also provides an all solid state battery comprising a first current collector, a first active material layer, a solid electrolyte layer, a second active material layer and a second current collector stacked in this order, and at least one layer or a stacked body of two layers or more of the first active material layer, the solid electrolyte layer, and the second active material layer includes at least one layer of a concentration gradient layer, the concentration gradient layer includes a binder and in a thickness direction, a binder concentration of one surface portion is higher than a binder concentration of another surface portion.

According to the present disclosure, by including the concentration gradient layer, an all solid state battery with an interlayer adhesion may be obtained.

In the disclosure, the first active material layer may be the concentration gradient layer, and in the first active material layer, a binder concentration of opposite side to the first current collector may be higher than a binder concentration of the first current collector side.

In the disclosure, the solid electrolyte layer may be the concentration gradient layer.

In the disclosure, the first active material layer and the solid electrolyte layer may be the concentration gradient layers respectively, and a high binder concentration surface portion of the first active material layer and a high binder concentration surface portion of the solid electrolyte layer may be disposed facing to each other.

In the disclosure, the first active material layer may be a stacked body including at least two layers or more of active material constituting layers, two adjacent active material constituting layers constituting the first active material layer may be the concentration gradient layers respectively, and the two adjacent active material constituting layer may be disposed so as the high binder concentration surface portion of one active material constituting layer and the high binder concentration surface portion of another active material constituting layer are facing to each other.

In the disclosure, in a thickness direction of the concentration gradient layer, when a region from a midportion to a surface portion with low binder concentration is regarded as a first region and a region from the midportion to a surface portion with high binder concentration is regarded as a second region, a proportion of a binder concentration of the second region to a binder concentration of the first region may be in a predetermined range.

Effects of Disclosure

The present disclosure exhibits an effect such that an all solid state battery may be produced with an improved transfer efficiency.

DESCRIPTION OF EMBODIMENTS

A method for producing an all solid state battery, and an all solid state battery in the present disclosure are hereinafter described in detail.

A. Method for Producing all Solid State Battery

The method for producing an all solid state battery in the present disclosure is a method for producing an all solid state battery including a first current collector, a first active material layer, a solid electrolyte layer, a second active material layer and a second current collector stacked in this order, the method comprises a transferring step of transferring a transfer layer onto the first current collector by using a transfer member including a transfer foil and the transfer layer, the transferring step being included in a step of forming at least one layer of the first active material layer, the solid electrolyte layer, and the second active material layer. A characteristic in the present disclosure is that the transfer layer includes a binder, and in a thickness direction, a binder concentration of a surface portion on opposite side to the transfer foil is higher than a binder concentration of a surface portion on the transfer foil side.

In the present disclosure, "transferring a transfer layer onto a first current collector" includes a case where the transfer layer is transferred in direct contact onto the first current collector, and a case where the transfer layer is transferred in contact with other layer (transfer receiving layer) formed on the first current collector. Incidentally, in the latter case, the transferring step may be recognized as a stacking step.

Figure 1A:
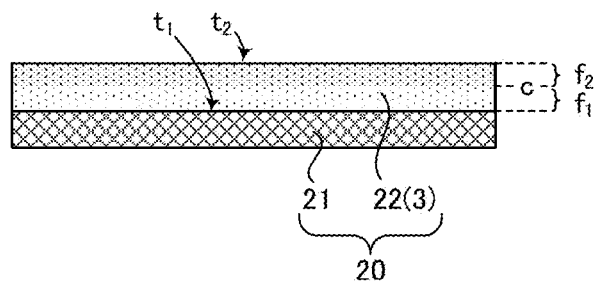
FIG. 1A is a schematic cross-sectional view illustrating an example of a method for producing an all solid state battery in the present disclosure in which a transfer member is formed.
Figure 1B:
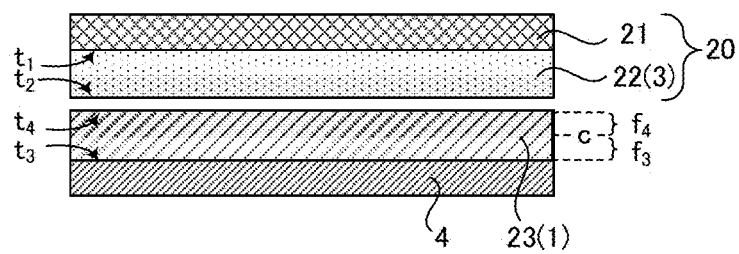
FIG. 1B is a schematic cross-sectional view illustrating an example of a method for producing an all solid state battery in the present disclosure in which a stacked body including a first current collector and a first active material layer is prepared.
Figure 1C:
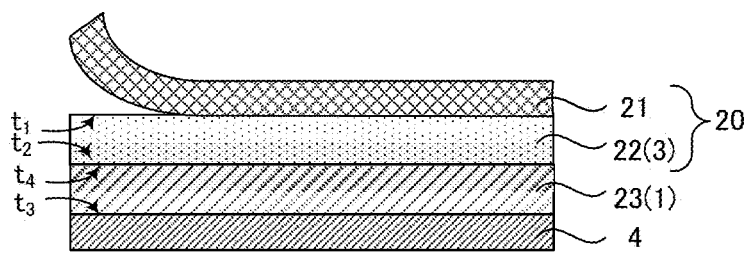
FIG. 1C is a schematic cross-sectional view illustrating an example of a method for producing an all solid state battery in the present disclosure in which a transfer layer is transferred by adhering the transfer layer on a transfer receiving layer and in which a transfer foil is peeled off.
Figure 1D:
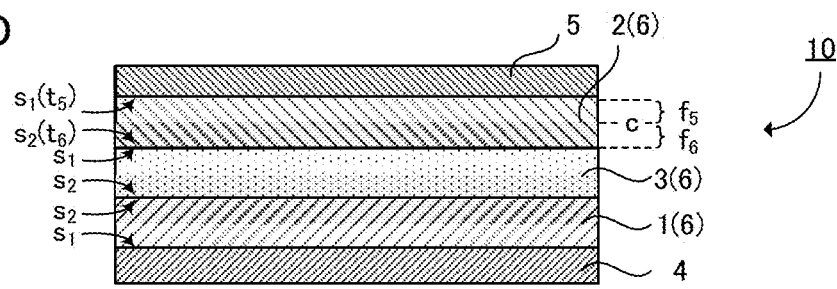
FIG. 1D is a schematic cross-sectional view illustrating an example of a method for producing an all solid state battery in the present disclosure in which a stacked body including a second current collector and a second active material layer is prepared.

FIGS. 1A to 1D are schematic cross-sectional views illustrating an example of a method for producing an all solid state battery in the present disclosure. In FIGS. 1A to 1D, an example wherein a step of forming a solid electrolyte layer is the transferring step is described. First, as shown in FIG. 1A, transfer member 20 including solid electrolyte layer 3 formed as transfer layer 22 on transfer foil 21 is prepared. In transfer layer 22, the binder concentration of surface portion $t_2$ on opposite side to transfer foil 21 is higher than the binder concentration of surface portion $t_1$ on transfer foil 21 side. Next, as shown in FIG. 1B, a stacked body including first current collector 4 and first active material layer 1 formed as transfer receiving layer 23 on first current collector 4 is prepared. In transfer receiving layer 23, the binder concentration of surface portion $t_4$ on opposite side to first current collector 4 is higher than the binder concentration of surface portion $t_3$ on first current collector 4 side, in the thickness direction. Next, as shown in FIG. 10, transfer layer 22 is transferred by adhering transfer layer 22 on transfer receiving layer 23 formed on first current collector 4, and peeling transfer foil 21 off. Thereby, solid electrolyte layer 3 may be formed. Next, as shown in FIG. 1D, a stacked body of second current collector 5 and second active material layer 2 is prepared. In second active material layer 2, the binder concentration of surface portion $t_6$ on opposite side to second current collector 5 is higher than the binder concentration of surface portion $t_5$ on second current collector 5 side. Next, solid electrolyte layer 3 on first current collector 4 and second active material layer 2 on second current collector 5 are disposed facing to each other. By the above described steps, all solid state battery 10 may be produced. In the method for producing an all solid state battery shown in FIGS. 1A to 1D, all solid state battery 10 comprising concentration gradient layer 6 whose binder concentration of one surface portion $s_1$ is higher than the binder concentration of other surface portion $s_2$, as first active material layer 1, solid electrolyte layer 3, and second active material layer 2, may be obtained as shown in FIG. 1D.

According to the present disclosure, by using the transfer layer, a transfer failure may be suppressed since the surface portion of the transfer layer with high binder concentration may be disposed on the first current collector, when transferring. Thereby, a method for producing an all solid state battery with improved transfer efficiency may be provided. Also, in the present disclosure, since the binder concentration of the surface portion on the transfer foil side of the transfer layer is low, the peeling property of the transfer foil, for example, may be improved.

Although not all solid state battery technology, JP-A No. H10-270013 and JP-A 2014-107182, for example, disclose a technology wherein more binder is distributed on a current collector side of an electrode layer used for a liquid battery. JP-A No. H10-270013 and JP-A 2014-107182 intend to improve the adhesion between the current collector and the electrode layer. However, both JP-A No. H10-270013 and JP-A 2014-107182 disclose to form the electrode layer directly on the current collector by coating with a slurry, and are silent about a technical idea of forming the electrode layer by using a transfer method.

Also, the binder itself does not contribute to the electron conductivity and the ion conductivity of a battery. Therefore, the binder is distributed evenly in a layer in many cases. When the transfer method is used, as in the later described Reference Example 1, for example, a transfer layer with uniform binder concentration is used as the transfer layer in many cases. Also, when more binder is distributed on the current collector side of the electrode layer, for example, a transfer failure tends to occur when the transfer layer is transferred to the electrode layer.

In contrast, in the present disclosure, since the binder concentration of the surface portion of a transfer layer disposed on the first current collector side is high, among the transfer layer and the first current collector, the adhesion of at least the first current collector side of the transfer layer may be improved. Therefore, the interlayer adhesion such as between the first active material layer and the solid electrolyte layer, between the second active material layer and the solid electrolyte layer, and between the active material constituting layers (when the active material layer is a stacked body of two layers or more) may be improved so that the transfer failure may be suppressed.

Also, in the liquid battery, the electrode layer is often stacked and wound with a film-formed separator as an insulating layer sandwiched between an anode and a cathode, and the binder often exhibits the function of binding particles in the electrode layer and binding to a current collector foil, but does not have a function of interface contacting the electrode layer and the electrolyte layer. Meanwhile, in an all solid state battery, a solid electrolyte layer is disposed in a place corresponding to the separator, and the binder has a function of interface contacting the solid electrolyte layer and the cathode active material layer or the anode active material layer. Also, the interface contact greatly influences the battery property. Therefore, a battery with improved battery property is not necessarily obtained, even if the adhesion between the current collector and the electrode layer is focused, similarly to the liquid battery. In the all solid state battery, when a contact failure between the layers occurs even in a micro portion, for example, the ion conduction in each layer is inhibited by the contact failure portion (such as a void), and the resistance of the battery as a whole is increased.

In contrast to this, since an all solid state battery with improved interlayer adhesion may be produced in the present disclosure, a battery with low resistance may be produced.

1. Transferring Step

In the present disclosure, a step of forming at least one layer of the first active material layer, the solid electrolyte layer, and the second active material layer includes the transferring step. The transferring step is a step of transferring the transfer layer onto the first current collector by using a transfer member including a transfer foil and the transfer layer.

(1) Kinds of Transfer Layer

The transfer layer may be a layer capable of forming at least one layer of a first active material layer, a solid electrolyte layer, and a second active material layer. The transfer layer may be, for example, a single layer of a first active material layer, a solid electrolyte layer or a second active material layer. Also, the transfer layer may be, for example, a stacked body including at least 2 layers or more of a first active material layer, a solid electrolyte layer and a second active material layer. When the transfer layer is a stacked body, examples of the transfer layer may include, with respect to the transfer foil, a stacked body including a solid electrolyte layer and a first active material layer stacked in this order, a stacked body including a second active material layer, a solid electrolyte layer and a first active material layer stacked in this order, and a stacked body including a second active material layer and a solid electrolyte layer stacked in this order.

Figure 2A:
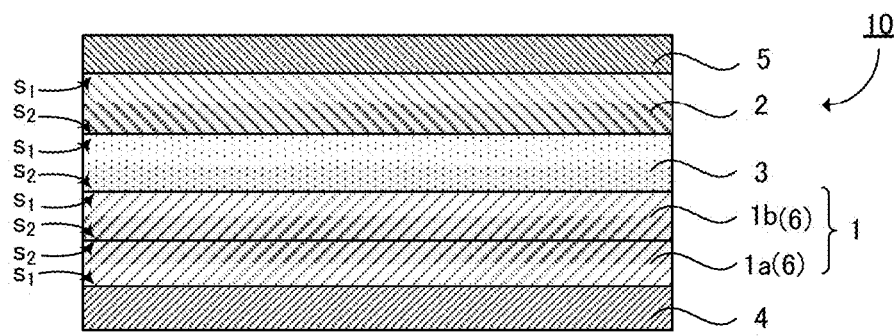
FIG. 2A is a schematic cross-sectional view illustrating an example of the all solid state battery in the present disclosure in which the first active material layer includes two layers of active material constituting layers.

Also, as shown in FIG. 2A, for example, when a stacked body including two layers or more of an active material constituting layers (in FIG. 2A, two layers of active material constituting layers 1a and 1b) is formed as first active material layer 1, examples of the transfer layer may include a layer including an active material constituting layer as the outermost layer. "The outermost layer of a transfer layer" is a layer including the surface portion of the transfer layer on opposite side to the transfer foil, and is a layer in contact with the first current collector or other layer on the first current collector when transferring. The transfer layer may be a single layer of the active material constituting layer. Also, the transfer layer may be a stacked body including the active material constituting layer as the outermost layer. Examples of such stacked body may include, with respect to the transfer foil, a stacked body including the solid electrolyte layer and the active material constituting layer stacked in this order, a stacked body including the second active material layer, the solid electrolyte layer and the active material constituting layer stacked in this order, and a stacked body including the active material constituting layer, the solid electrolyte layer, and the active material constituting layer stacked in this order. Also, when a stacked body including two layers or more of the active material constituting layers is formed as the second active material layer, examples of the transfer layer may include a single layer of the active material constituting layer.

Also, when a stacked body including two layers or more of solid electrolyte constituting layers is formed as the solid electrolyte layer, for example, examples of the transfer layer may include a layer including the solid electrolyte constituting layer as the outermost layer. The transfer layer may be a single layer of the solid electrolyte constituting layer. Also, the transfer layer may be a stacked body including the solid electrolyte constituting layer as the outermost layer of the transfer layer. Examples of such transfer layer may include, with respect to the transfer foil, a stacked body including the second active material layer and the solid electrolyte constituting layer stacked in this order, and a stacked body including the active material constituting layer and the solid electrolyte constituting layer stacked in this order.

(2) Transfer Member

The transfer member in the present disclosure includes a transfer foil and a transfer layer. The transfer layer includes a binder, and in a thickness direction, a binder concentration of a surface portion on opposite side to the transfer foil is higher than a binder concentration of a surface portion on the transfer foil side.

As shown in FIG. 1A, in the thickness direction of transfer layer 22, the position corresponding to 50% of the thickness to the total thickness is regarded as midportion c. Also, in the thickness direction of transfer layer 22, the region from midportion c to surface portion $t_1$ on the transfer foil side is regarded as first region $f_1$, and the region from midportion c to surface portion $t_2$ on opposite side to transfer foil 21 is regarded as second region $f_2$. The ratio ($C_2/C_1$) of binder concentration $C_2$ of second region $f_2$ to binder concentration $C_1$ of first region $f_1$ in the transfer layer is, for example, more than 100%, may be 101% or more, may be 103% or more, may be 105% or more, and may be 109% or more. Also, the ratio ($C_2/C_1$) is, for example, less than 200%, may be 190% or less, may be 170% or less, may be 120% or less, and may be 110% or less. When the ratio ($C_2/C_1$) is too high, a portion with too high binder concentration may occur between the constituting layers of the all solid state battery so that the electric resistance may be adversely effected.

The binder concentration of the transfer layer may be measured by the following method using FE-EPMA (Field Emission Electron Probe Micro Analysis). First, the transfer layer is subjected to a CP processing (Cross Section Polishing) based on an ion milling so as to form a cross section for the measurement. Next, the objective element included in the binder is mapped by carrying out a FE-EPMA observation to the processed cross section by using a wavelength-dispersive X-ray spectroscopy (WDX), and the binder distribution area is analyzed. Specifically, the strength of the color indicating the objective element in the map image is digitalized per pixel, and the distribution area is determined as the numerical value of the counted pixels with a predetermined strength or more. The distribution ratio of the current collector foil side and the surface side is determined based on the analyzing result of the binder distribution area.

The transfer layer includes a binder (resin binder). Examples of the binder may include a polyvinylidene fluoride based polymer, a styrene-butadiene based polymer, a (meth)acryl resin based polymer, acrylonitrile-butadiene based polymer, a butylene rubber (BR), and mixture of these.

In addition to the binder, the transfer layer further includes, for example, an active material, a conductive material, and a solid electrolyte, according to the kind of the layer formed by using the transfer layer. These materials are described later. Also, the thickness of the transfer layer is appropriately selected according to the kind of the layer formed by using the transfer layer.

As the transfer foil, a transfer foil used in known transfer methods may be used, and examples may include a metal foil.

Examples of a method for forming the transfer layer on the transfer foil (method for forming a transfer member) may include a coating method; specifically, may include a method including a coating layer forming step of forming a coating layer by coating a transfer foil with a slurry, and a drying step of forming a transfer layer by drying the coating layer. In the present disclosure, the binder concentration of a surface portion on opposite side to the transfer foil may be made higher than the binder concentration of a surface portion on the transfer foil side, in the thickness direction, by adjusting, for example, the kind of the resolvent used in the slurry and the drying conditions.

The slurry includes a binder, a resolvent, and a material for an active material layer or a material for a solid electrolyte layer. Examples of the resolvent may include non-polar resolvents such as heptane, methylcyclohexane, and toluene; aprotic polar resolvents such as methyl isobutyl ketone and cyclohexanone; and mixture of these. The solid content concentration of the slurry may be, for example, 45 weight % or more, and may be 65 weight % or less.

The slurry may be, for example, purchased from others, and may be prepared by oneself. Examples of a method for preparing the slurry may include a method wherein the materials for the above described slurry are mixed and kneaded. Examples of a method for mixing and kneading may include an ultrasonic homogenizer, a shaker, a thin-film rotating type mixer, a dissolver, a homo mixer, a kneader, a roll mill, a sand mill, an attritor, a ball mill, a vibrator mill, and a high-speed impeller mill.

Examples of a method for coating the slurry may include a doctor blade method, a die coating method, a gravure coating method, a spray coating method, an electrostatic coating method and a bar coating method. Incidentally, when a stacked body including at least two layers of, for example, the first active material layer, the solid electrolyte layer, and the second active material layer is formed as the transfer layer, a known two-layer coating method may be used, for example.

For the transfer layer, a binder concentration gradient may be obtained by adjusting, for example the drying condition of the coating layer. In some embodiments, the drying condition is, for example, a quick drying by a heat treatment.

Also, the method for drying the coating layer is not particularly limited; examples of the method may include general methods such as warm-air/hot-blast drying, infrared ray drying, reduced-pressure drying, and dielectric heat drying. Also, examples of the drying atmosphere may include inert gas atmospheres such as an Ar gas atmosphere and a nitrogen gas atmosphere, an air atmosphere, and a vacuum. The drying temperature is not particularly limited, and is a temperature wherein the materials included in the coating layer are not deteriorated. After drying the coating layer, at least one of a teat treatment and a press treatment may be carried out as necessary.

The transfer layer may be the concentration gradient layer described in the section "3. All solid state battery" below, by being disposed on the first current collector.

(3) Transferring Step

In the transferring step, for example, the transfer layer may be transferred directly on the first current collector, and the transfer layer may be transferred being in contact with other layer (transfer receiving layer) formed on the first current collector. The transfer receiving layer is not particularly limited as long as the first active material layer, the solid electrolyte layer, and the second active material layer in the all solid state battery may be formed, and may be appropriately selected according to the kind of the transfer layer.

Examples of the kind of the transfer receiving layer may include a single layer or a stacked body of the active material constituting layer(s); a single layer of the first active material layer; a stacked body including the first active material layer and the solid electrolyte constituting layer stacked in this order; a stacked body including the first active material layer and the solid electrolyte layer stacked in this order; and a stacked body including the first active material layer, the solid electrolyte layer, and the active material constituting layer stacked in this order, with respect to the first current collector.

The transfer receiving layer is not particularly limited as long as it is capable of constituting the above described single layer or stacked body. In some embodiments, the transfer receiving layer may include a binder, and in a thickness direction, the binder concentration of a surface portion on opposite side to the first current collector is higher than the binder concentration of a surface portion on the first current collector side. Since the transfer receiving layer and the transfer layer may be disposed so that each of the surface portions with high binder concentration are facing to each other, and an all solid state battery with more improved interlayer adhesion may be obtained.

As shown in FIG. 1B, in the thickness direction of transfer receiving layer 23, the region from midportion c to surface portion $t_3$ on the first current collector side is regarded as first region $f_3$, and the region from midportion c to surface portion $t_4$ on opposite side to first current collector 4 is regarded as second region $f_4$. The ratio ($C_4/C_3$) of binder concentration $C_4$ of second region $f_4$ to binder concentration $C_3$ of first region $f_3$ in transfer receiving layer 23 may be similar to the ratio ($C_2/C_1$) of the binder concentration in the above described transfer layer. In some embodiments, the binder concentration ratio is adjusted, for example, so as the adhesion between the first current collector and the transfer receiving layer is ensured.

In some embodiments, the above described transfer receiving layer with a binder concentration gradient is, for example, the first active material layer, and the transfer layer is a layer including the solid electrolyte layer as the outermost layer. The reason therefor is to obtain an all solid state battery with improved adhesion between the first active material layer and the solid electrolyte layer.

In some embodiments, the above described transfer receiving layer with a binder concentration gradient is a $n^{th}$ active material constituting layer wherein n is an integer of one or more, and the transfer layer is a (n+1)th active material constituting layer. The reason therefor is to obtain a first active material layer with improved adhesion between the active material constituting layers.

A method for forming the above described transfer receiving layer with a binder concentration gradient may be the same as the above described method for forming the transfer layer; thus, the descriptions herein are omitted.

In some embodiments, the above described transfer receiving layer with a binder concentration gradient may improve the transfer efficiency even when, for example, a layer with no binder concentration gradient is used as the transfer layer, and when a layer wherein the binder concentration of the transfer foil side is high, is used as the transfer layer. That is, the present disclosure may also provide, for example, a method for producing an all solid state battery including a first current collector, a first active material layer, a solid electrolyte layer, a second active material layer and a second current collector stacked in this order, the method comprising: a transferring step of transferring a transfer layer onto a transfer receiving layer formed on the first current collector by using a transfer member including a transfer foil and the transfer layer, the transferring step being included in a step of forming at least one layer of the first active material layer, the solid electrolyte layer, and the second active material layer, and the transfer receiving layer includes a binder, and in a thickness direction, a binder concentration of a surface portion on opposite side to the first current collector is higher than a binder concentration of a surface portion on the first current collector side.

Examples of a method for transferring the transfer layer of the transfer member onto the first current collector may include a method wherein the transfer layer is disposed on the first current collector, and then, pressed. Examples of a method for pressing may include a pressing method used in a known transfer method, and examples may include a roll pressing method.

2. Other Steps

The method for producing an all solid state battery in the present disclosure is not particularly limited as long as it includes the above described transferring step, and necessary steps may be appropriately selected and added. Examples of such step may include a step of forming a transfer member, and a step of forming a transfer receiving layer.

Also, examples may include a preparing step of preparing a stacked body wherein a second active material layer is formed on a second current collector. In some embodiments, the second active material layer is, for example, a layer including a binder, and the binder concentration of opposite side to the second current collector is higher than the binder concentration of the second current collector side. The reason therefor is to improve the adhesion between the solid electrolyte layer and the second active material layer.

As shown in FIG. 1D, in the thickness direction of second active material layer 2, the region from midportion c to surface portion on second current collector 5 side is regarded as first region $f_5$, and the region from midportion c to surface portion on opposite side to the second current collector 5 is regarded as second region $f_6$. The ratio ($C_6/C_5$) of binder concentration ($C_6$) of second region $f_6$ to binder concentration ($C_5$) of first region $f_5$ in second active material layer 2 may be similar to the ratio ($C_2/C_1$) of the binder concentration in the above described transfer layer. A method for forming the second active material layer may be the same as the method for forming the above described transfer layer; thus, the descriptions herein are omitted.

3. All Solid State Battery

As shown in FIG. 1D, all solid state battery 10 obtained in the present disclosure includes first current collector 4, first active material layer 1, solid electrolyte layer 3, second active material layer 2 and second current collector 5 in this order. Also, in FIG. 1D, first active material layer 1, solid electrolyte layer 3, and second active material layer 2 in all solid state battery 10 are concentration gradient layer 6. Concentration gradient layer 6 is a layer including a binder, and in a thickness direction, the binder concentration of one surface portion $s_2$ is higher than the binder concentration of other surface portion $s_1$. In FIG. 1D, the surface portion with low binder concentration of the concentration gradient layer is indicated with $s_1$, and the surface portion with high binder concentration is indicated with $s_2$. FIG. 1D shows an example wherein each layer is disposed so that surface portion $s_2$ of the first active material layer and surface portion $s_2$ of the solid electrolyte layer are facing to each other, and surface portion $s_1$ of the solid electrolyte layer and surface portion $s_2$ of the second active material layer are facing to each other.

Figure 2B:
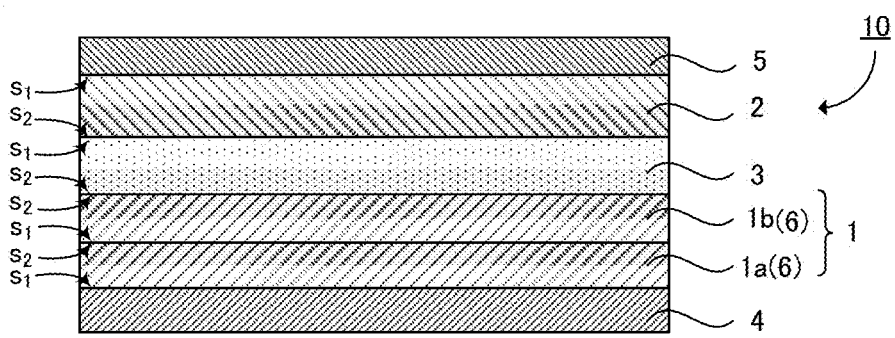
FIG. 2B is a schematic cross-sectional view illustrating another example of the all solid state battery in the present disclosure in which the first active material layer includes two layers of active material constituting layers.
Figure 2C:
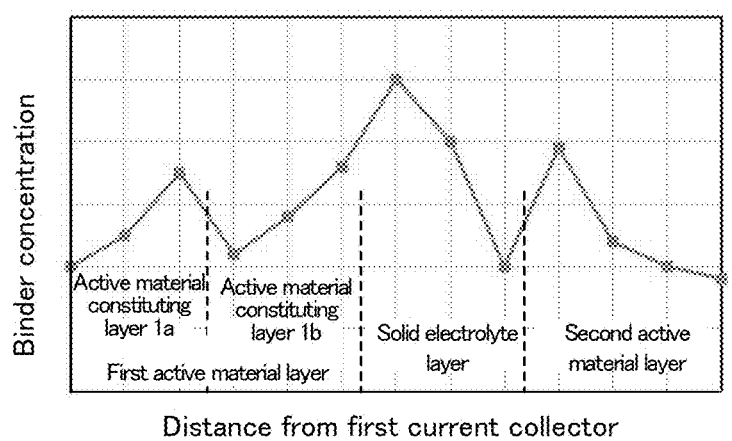
FIG. 2C is a graph illustrating an example of a binder distribution in an all solid state battery.

Also, FIG. 2A shows an example of all solid state battery 10 wherein the first active material layer includes two layers of active material constituting layers 1a and 1b, the two layers of active material constituting layers 1a and 1b are concentration gradient layers 6, and surface portions $s_2$ of active material constituting layers 1a and 1b are disposed facing to each other. FIG. 2B shows an example of all solid state battery 10 wherein the first active material layer includes two layers of active material constituting layers 1a and 1b, the two layers of active material constituting layers 1a and 1b are concentration gradient layers 6, and surface portion $s_2$ of active material constituting layer 1a and surface portion $s_1$ of active material constituting layer 1b are disposed facing to each other. FIG. 2C is a graph showing the binder distribution in the thickness direction of the all solid state battery shown in FIG. 2B, and shows that the battery includes three peaks of the binder amount in the thickness direction of the stacked body of the first active material layer, the solid electrolyte layer, and the second active material layer sandwiched between the first current collector and the second current collector.

Figure 3:
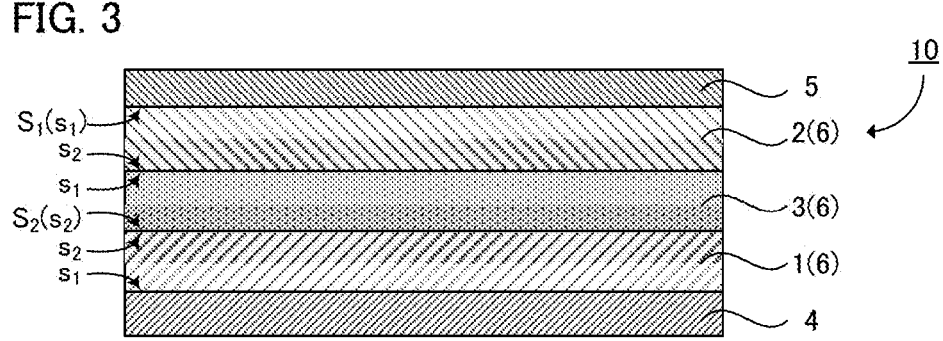
FIG. 3 is a schematic cross-sectional view illustrating an example of an all solid state battery in the present disclosure.

Also, FIG. 3 shows an example of all solid state battery 10 wherein first active material layer 1, solid electrolyte layer 3, and second active material layer 2 are concentration gradient layers 6. Also, FIG. 3 shows an example wherein, when the stacked body of solid electrolyte layer 3 and second active material layer 2 is observed, the binder concentration of surface portion $S_2$ on the first active material layer side is higher than the binder concentration of surface portion $S_1$ on second current collector side. Also, FIG. 3 shows an example wherein the binder concentration of surface portion $s_1$ of solid electrolyte layer 3 is equal to the binder concentration of surface portion $s_2$ of second active material layer 2, higher than the binder concentration of surface portion $S_1$, and lower than the binder concentration of surface portion $S_2$. In this case, the stacked body of solid electrolyte layer 3 and second active material layer 2 may be regarded as one concentration gradient layer 6. All solid state battery 10 shown in FIG. 3 may be obtained by, for example, using a stacked body of the solid electrolyte layer and the second active material layer as the transfer layer.

(1) Concentration Gradient Layer

The concentration gradient layer is a layer including a binder, and the binder concentration of one surface portion is higher than the binder concentration of the other surface portion. The kind of the concentration gradient layer may be in the same contents as those described in "1. Transferring step, (1) Kinds of transfer layer" above; thus, the descriptions herein are omitted.

In the thickness direction of the concentration gradient layer, when the region from a midportion to a surface portion with the low binder concentration is regarded as a first region, and the region from the midportion to surface portion with the high binder concentration is regarded as a second region, the ratio ($C_{High}/C_{Low}$) of binder concentration ($C_{High}$) of the second region to binder concentration ($C_{Low}$) of the first region, may be in the same as the ratio ($C_2/C_1$) in the transfer layer described in "1. Transferring step, (2) Transfer member" above; thus, the descriptions herein are omitted. The points other than the above-described about the concentration gradient layer may be the same as the above described transfer layer.

(2) Constitution of all Solid State Battery

The all solid state battery in the present disclosure comprises a first current collector, a first active material layer, a solid electrolyte layer, a second active material layer and a second current collector in this order.

(i) First Current Collector

The first current collector may be an anode current collector, and may be a cathode current collector. When the first current collector is the anode current collector, examples of the materials for the anode current collector may include SUS, Cu, Ni, and Fe. Meanwhile, when the first current collector is the cathode current collector, examples of the materials for the cathode current collector may include SUS, aluminum, nickel, iron, titanium and carbon. Examples of the shape of the first current collector may include a foil shape and a mesh shape. The thickness of the first current collector is not particularly limited.

(ii) First Active Material Layer

The first active material layer is an active material layer formed on the first current collector. The first active material layer may be a single layer, and may be a stacked body including two layers or more of active material constituting layers. When the first active material layer is the stacked body, the number of the active material constituting layers may be, for example, 2 layers or more, and may be 4 layers or less.

The first active material layer may be an anode active material layer and may be a cathode active material layer. When the first active material layer is the anode active material layer, the layer includes at least an anode active material. The anode active material layer may include just the anode active material, and may include at least one of a solid electrolyte, a conductive material, and a binder, as other material. Also, when the first active material layer is the cathode active material layer, the layer may include just the cathode active material, and may further include the above described other materials.

Examples of the anode active material may include a metal active material, a carbon active material, and an oxide active material. Examples of the metal active material may include Li, In, Al, Si, Sn and an alloy including at least one kind of these. Examples of the carbon active material may include graphite, hard carbon, and soft carbon. Examples of the oxide active material may include $Nb_2O_5$, $Li_4Ti_5O_{12}$, and SiO.

Examples of the cathode active material may include an oxide active material. Examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$, and $Li_4Ti_5O_{12}$, and $Li(Ni_{0.5}Mn_{1.5})O_4$; and olivine type active materials such as $LiFePO_4$, and $LiMnPO_4$, $LiNiPO_4$, and $LiCoPO_4$. The surface of the cathode active material may be coated with a lithium ion conductive oxide. Examples of the lithium ion conductive oxide may include $LiNbO_3$, $Li_4Ti_5O_{12}$, and $Li_3PO_4$.

The proportion of the active material in the first active material layer is, for example, 20 weight % or more, may be 30 weight % or more, and may be 40 weight % or more. Meanwhile, the proportion of the active material is, for example, 80 weight % or less, may be 70 weight % or less, and may be 60 weight % or less.

Examples of the solid electrolyte may include an inorganic solid electrolyte such as a sulfide solid electrolyte, an oxide solid electrolyte, a nitride solid electrolyte, and a halide solid electrolyte. The sulfide solid electrolyte includes at least a S element, and is a compound having an ion conductivity. Examples of the sulfide solid electrolyte having lithium ion conductivity may include a solid electrolyte including a Li element, an X element (X is at least one kind of P, As, Sb, Si, Ge, Sn, B, Al, Ga, and In), and a S element. Also, the sulfide solid electrolyte may further include at least either one of an O element and a halogen element. Examples of the halogen element may include a F element, a Cl element, a Br element, and an I element.

The sulfide solid electrolyte may be a glass based sulfide solid electrolyte, may be a glass ceramic based sulfide solid electrolyte, and may be a crystal based sulfide solid electrolyte. Also, the sulfide solid electrolyte may include a crystal phase. Examples of the crystal phase may include a Thio-LISICON type crystal phase, a LGPS type crystal phase, and an argyrodite type crystal phase.

Examples of the shape of the solid electrolyte may include a granular shape. The average particle size ($D_{50}$) of the solid electrolyte is, for example, 0.1 µm or more, and may be 1 µm or more. Meanwhile, the average particle size ($D_{50}$) of the solid electrolyte is, for example, 50 µm or less, and may be 30 µm or less. The average particle size ($D_{50}$) may be determined by observation with, for example, a scanning electron microscope (SEM). In some embodiments, the number of the sample is large; for example, 100 or more. In some embodiments, the ion conductivity of the solid electrolyte is high. The ion conductivity of the solid electrolyte at 25° C. is, for example, $1 \times 10^{-5}$ S/cm or more, may be $1 \times 10^{-4}$ S/cm or more, and may be $1 \times 10^{-3}$ S/cm or more.

Examples of the conductive material may include a carbon material. Examples of the carbon material may include particulate carbon materials such as acetylene black (AB) and Ketjen black (KB); fibrous carbon materials such as carbon fiber, carbon nanotube (CNT), and carbon nanofiber (CNF). Examples of the binder may include the binders described in "1. Transferring step, (2) Transfer member" above.

The thickness of the first active material layer is, for example, 0.1 µm or more and 1000 µm or less.

The first active material layer may or may not include the concentration gradient layer. Also, when the first active material layer is a single layer of the concentration gradient layer only, the surface portion with high binder concentration may be the surface portion on opposite side to the first current collector. In some embodiments, when the first active material layer is a single layer of the concentration gradient layer only, the surface portion with high binder concentration may be the surface portion on the first current collector side.

(iii) Solid Electrolyte Layer

The solid electrolyte layer is a layer formed between a cathode and an anode. The solid electrolyte layer includes at least a solid electrolyte, and may include a binder as necessary. The solid electrolyte and the binder may be in the same contents as those described in "(ii) First active material layer" above; thus, the descriptions herein are omitted. The thickness of the solid electrolyte layer is, for example, 0.1 µm or more and 1000 µm or less. The solid electrolyte layer may or may not be the concentration gradient layer.

(iv) Second Active Material Layer

The second active material layer may be an anode active material layer and may be a cathode active material layer. The second active material layer may be in the same contents as those described in "(ii) First active material layer" above; thus, the descriptions herein are omitted.

(v) Second Current Collector

The second current collector is a member collecting current of the second active material layer. The second current collector may be an anode current collector, and may be a cathode current collector. The material and shape of the second current collector may be in the same contents as those described in "(i) First current collector" above; thus, the descriptions herein are omitted.

(3) All Solid State Battery

In the all solid state battery in the present disclosure, at least one layer of the first active material layer, the solid electrolyte layer, and the second active material layer includes a concentration gradient layer. Therefore, the all solid state battery includes at least one peak of the binder amount, in the thickness direction of a stacked body of the first active material layer, the solid electrolyte layer, and the second active material layer sandwiched between the first current collector and the second current collector. The number of the peak(s) is, for example, 1 or more, and may be 2 or more. Also, the upper limit of the number of the peaks is not particularly limited, and may be, for example, 3.

Also, the all solid state battery in the present disclosure may include a layer with no binder concentration gradient (uniform layer) in the thickness direction of the layers in the all solid state battery. The uniform layer may be formed by, for example, a compression molding of the material of each layer.

In some embodiments, the all solid state battery is an all solid state lithium ion battery. Also, the all solid state battery in the present disclosure may be a primary battery, and may be a secondary battery. In some embodiments, the all solid state battery may be the secondary battery so as to be repeatedly charged and discharged, and is useful as, for example, a car-mounted battery. The secondary battery includes a usage of a secondary battery as a primary battery (the use for the purpose of just initial charge).

B. All Solid State Battery

The all solid state battery in the present disclosure comprises a first current collector, a first active material layer, a solid electrolyte layer, a second active material layer and a second current collector stacked in this order, and at least one layer or a stacked body of two layers or more of the first active material layer, the solid electrolyte layer, and the second active material layer includes at least one layer of a concentration gradient layer, the concentration gradient layer includes a binder and in a thickness direction, a binder concentration of one surface portion is higher than a binder concentration of another surface portion.

According to the present disclosure, since the all solid state battery includes the concentration gradient layer, an all solid state battery with an improved interlayer adhesion may be obtained. Also, since the interlayer adhesion in the all solid state battery is improved, the deterioration of the all solid state battery due to a processing such as a punching process and a cutting process may be suppressed. Also, in the present disclosure, since the interlayer adhesion in the all solid state battery is improved, an all solid state battery with low resistance may be obtained.

The details for the all solid state battery in the present disclosure may be in the same contents as those described in "A. Method for producing all solid state battery, 3. All solid state battery" above; thus, the descriptions herein are omitted.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

<Preparation of Cathode Structure>

A cathode structure including a cathode current collector and a cathode mixture layer (cathode active material layer) was obtained by the following procedure.

A cathode active material ($LiNi_{1/3}Mn_{1/3}Co_{1/3}O_2$) and a sulfide solid electrolyte ($LiI—Li_2O—Li_2S—P_2S_5$) were mixed so as to be active material:sulfide solid electrolyte=70:30 in the weight ratio to obtain a mixture, and the mixture was weighed so as to be 96.5 weight parts to 100 weight parts of the cathode mixture layer. Next, a PVDF binder solution and a conductive material (vapor-grown carbon fiber, manufactured by Showa Denko K. K.) were prepared and weighed so as the solid content of the PVDF binder solution was 3.0 weight parts, and the conductive material was 3.0 weight parts to 100 weight parts of the cathode mixture layer, and added to the mixture. Further, methyl isobutyl ketone (dehydrated product) was added to the mixture as a resolvent (solvent), and mixed and kneaded for one minute with an ultrasonic homogenizer (UH-50, manufactured by SMT Co., Ltd.). Finally, ethylcellulose (EC, manufactured by Nacalai Tesque, Inc.) dissolved in methyl isobutyl ketone was added so as EC was 0.2 weight parts to 100 weight parts of the cathode mixture layer. To the mixture, further methyl isobutyl ketone was added so as the solid content rate was 60 weight %, and a cathode slurry was prepared by mixing and kneading for one minute with an ultrasonic homogenizer.

The surface of a cathode current collector (an aluminum foil) was coated with the cathode slurry by using an applicator. After coating, the resultant was dried by hot air for 30 minutes at 80° C. Then, a heat drying was carried out on a hot plate at 120° C. for 2 hours, and a cathode mixture layer was obtained. By the above described steps, a cathode structure was obtained.

<Preparation of Anode Structure>

An anode structure including an anode current collector and an anode mixture layer (anode active material layer) was obtained by the following procedure.

An anode active material (natural graphite, particle size: 15.0 μm) and a sulfide solid electrolyte ($LiI—Li_2O—Li_2S—P_2S_5$) were mixed so as to be anode active material:sulfide solid electrolyte=60:40 in the weight ratio to obtain a mixture, and the mixture was weighed so as to be 96.8 weight parts to 100 weight parts of the anode mixture layer. Next, a PVDF binder solution was weighed so as the solid content of the solution was 3.0 weight parts to 100 weight parts of the anode mixture layer, and added to the mixture. Further, methyl isobutyl ketone (dehydrated product) was added to the mixture as a resolvent, and mixed and kneaded for one minute with an ultrasonic homogenizer (UH-50, manufactured by SMT Co., Ltd.). Finally, ethylcellulose (EC, manufactured by Nacalai Tesque, Inc.) dissolved in methyl isobutyl ketone was added so as EC was 0.2 weight parts to 100 weight parts of the anode mixture layer. To the mixture, further methyl isobutyl ketone was added so as the solid content rate was 55 weight %, and an anode slurry was prepared by mixing and kneading for one minute with an ultrasonic homogenizer. Then, the surface of a SUS foil as an anode current collector was coated with the anode slurry by using an applicator. After coating, the resultant was dried by hot air for 30 minutes at 80° C. Then, a heat drying was carried out on a hot plate at 120° C. for 2 hours, and an anode mixture layer was obtained. By the above described steps, an anode structure was obtained.

<Preparation of Solid Electrolyte Layer>

A solid electrolyte layer was prepared on a transfer foil (a transfer member was prepared) by the following procedure.

The above described sulfide solid electrolyte was weighed so as to be 96.5 weight parts, a PVDF binder solution was weighed so as the solid content of the solution was 3.0 weight parts, ethylcellulose (EC, manufactured by Nacalai Tesque, Inc.) dissolved in methyl isobutyl ketone was weighed so as the solid content was 0.5 weight parts, and mixed. Further, to the mixture, methyl isobutyl ketone was added as a resolvent so as the solid content was 45 weight %, and a solid electrolyte layer slurry was obtained by mixing and kneading with an ultrasonic homogenizer (UH-50, manufactured by SMT Co., Ltd.). An aluminum foil was coated with the solid electrolyte layer slurry by using an applicator. After coating, the resultant was dried by hot air for 30 minutes at 80° C. Then, a heat drying was carried out on a hot plate at 120° C. for 2 hours, and a solid electrolyte layer was formed.

<Preparation of Evaluation Battery>

An evaluation battery was obtained by sandwiching the solid electrolyte layer peeled off from the aluminum foil so as the layers were stacked with the cathode mixture layer and the anode mixture layer facing to each other, in an inert gas, and pressing under pressure of 4.3 ton. Incidentally, the layers were stacked so as the solid electrolyte layer on opposite side to the aluminum foil was disposed on the anode mixture layer side.

Example 2

A cathode structure, an anode structure, a solid electrolyte layer, and an evaluation battery were obtained in the same manner as in Example 1 except that each slurry coated surface was dried by hot air for 30 minutes at 100° C., then, a heat drying was carried out on a hot plate at 120° C. for 2 hours.

Example 3

A cathode structure, an anode structure, a solid electrolyte layer, and an evaluation battery were obtained in the same manner as in Example 1 except that each slurry coated surface was dried by hot air for 30 minutes at 150° C., then, a heat drying was carried out on a hot plate at 120° C. for 2 hours.

Example 4

A cathode structure, an anode structure, a solid electrolyte layer, and an evaluation battery were obtained in the same manner as in Example 1 except that each slurry coated surface was dried by hot air for 30 minutes at 170° C., then, a heat drying was carried out on a hot plate at 120° C. for 2 hours.

Example 5

A cathode structure, an anode structure, a solid electrolyte layer, and an evaluation battery were obtained in the same manner as in Example 1 except that each slurry coated surface was dried by hot air for 30 minutes at 200° C., then, a heat drying was carried out on a hot plate at 120° C. for 2 hours.

Comparative Example 1

A cathode structure, an anode structure, a solid electrolyte layer, and an evaluation battery were obtained in the same manner as in Example 1 except that the solid content concentration of the cathode slurry was 45 weight %, the solid content concentration of the anode slurry was 50 weight %, the solid content concentration of the solid electrolyte layer slurry was 40 weight %, and each slurry coated film was dried for one hour with an infrared drying device set so as the coated film surface temperature was 100° C.

Reference Example

A cathode structure, an anode structure, a solid electrolyte layer, and an evaluation battery were prepared under producing conditions similar to the producing conditions for an evaluation battery in Reference Example 1 described in JP-A 2018-190537, as an example of a method for producing an evaluation battery by a known transfer method. Incidentally, the publication discloses that a cathode active material layer, a solid electrolyte layer, and an anode active material layer were formed by, after coating a current collector or a transfer foil with a slurry including butyl butyrate, drying the coating layer naturally, and then, drying on a hot plate for 30 minutes at 100° C.

[Evaluation]
<Resin Binder Concentration Evaluation>

The binder concentration of the cathode mixture layer, the solid electrolyte layer, and the anode mixture layer was determined by carrying out an FE-EPMA observation to the cathode structure, the transfer member, and the anode structure obtained in Examples, Comparative Example, and Reference Example. The results for the cathode mixture layer are shown in Table 1.

<Transfer Ratio>

The anode structure and the transfer member were cut, stacked so as the anode mixture layer of the anode structure and the solid electrolyte layer of the transfer member were facing to each other, and then, roll pressed under a line pressure of 4 ton/m. After pressing, whether or the solid electrolyte layer was transferred on the whole of the anode mixture layer or not was visually observed, and a case wherein the solid electrolyte layer was transferred on the whole was determined as OK. This test was carried out to 20 samples, and the transfer ratio was determined as the proportion of the number of the OK samples among the total (success rate). The transfer ratio of 90% or more was determined as acceptable. The results are shown in Table 2.

<Adhesion>

The presence or absence of an edge failure and a surface failure was evaluated. As the edge failure evaluation, a punching process was carried out to the obtained evaluation batteries. After the punching process, the presence or absence of the edge failure was confirmed, and a case wherein the failure did not occur was determined as OK, and a case wherein the failure occurred was determined as NG. 20 samples were evaluated, and the edge adhesion ratio (%) was determined as the proportion of the number of the OK samples among the total. The results are shown in Table 2. Incidentally, the edge failure tends to occur when the interlayer adhesion is low.

Also, as the surface failure evaluation, the transfer member before transfer was punched, and a case wherein a failure did not occur on the surface side at punching and the raw material powder was not adhered was determined as OK, and a case wherein the failure or the raw material powder adhesion occurred was determined as NG. By the evaluation, the surface adhesion ratio (%) was determined as the proportion of the number of the OK samples among the

TABLE 1

|  | Anode mixture layer | | | Solid electrolyte layer | | | Cathode mixture layer | | |
| --- | --- | --- | --- | --- | --- | --- | --- | --- | --- |
|  | Binder concentration | | Binder concentration ratio t4/t3 | Binder concentration | | Binder concentration ratio t2/t1 | Binder concentration | | Binder concentration ratio t6/t5 |
|  | Surface side t4 | Foil side t3 | | Surface side t2 | Foil side t1 | | Surface side t6 | Foil side t5 | |
| Example 1 | 403 | 369 | 109% | 253 | 246 | 103% | 529 | 489 | 108% |
| Example 2 | 1086 | 894 | 121% | 214 | 194 | 110% | 867 | 731 | 119% |
| Example 3 | 1413 | 846 | 167% | 348 | 249 | 140% | 891 | 539 | 165% |
| Example 4 | 1005 | 957 | 105% | 284 | 270 | 105% | 887 | 845 | 105% |
| Example 5 | 1304 | 685 | 190% | 425 | 310 | 137% | 1002 | 547 | 183% |
| Comp. Ex. 1 | 891 | 921 | 97% | 239 | 249 | 96% | 689 | 722 | 95% |
| Ref. Ex. 1 | 886 | 888 | 100% | 297 | 296 | 100% | 601 | 603 | 100% |

From the results shown in Table 1, it was confirmed that, in the anode mixture layers in Examples 1 to 5, the binder concentration of the surface portion on opposite side to the transfer foil (binder concentration of the surface side) was higher than the binder concentration of the surface portion on the transfer foil side (binder concentration of the foil side). In contrast, it was confirmed that, in the anode mixture layers in Reference Example and Comparative Example, the binder concentration of the surface side was lower than or same as the binder concentration of the foil side. Incidentally, the results similar to those of the anode active material layer were obtained by similarly measuring for the solid electrolyte layer of the transfer member, and the cathode active material layer of the cathode structure.

total. The results are shown in Table 2. Incidentally, "powder fall", that is, the failure of the powder occurs when the surface adhesion before the transfer is not sufficient. The "powder fall" is a cause of the lowering of the transfer efficiency, and also a cause of the lowering of the interlayer adhesion of the battery after the transfer.

<Resistance>

The Li ion conductivity (ambient temperature) measurement was carried out by an AC impedance method to the evaluation batteries. Solartron 1260 was used for measuring, and the measuring conditions were; applied voltage of 10 mV, measuring frequency range of 0.01 MHz to 1 MHz. Incidentally, a test cell was prepared by the following procedure. Under an environment of 25° C.±1° C., a not yet charged evaluation battery was charged at constant current with current value of 0.1 C until the voltage of a terminal per cell reaches the predetermined voltage, and then, the battery was charged at constant current/constant voltage for one hour, maintaining the voltage at the predetermined voltage. After the initial charge, the battery was discharged at constant current/constant voltage for 10 hours to 4.2 V at 0.2 C. After that, under an environment of 25° C.±1° C., the battery was charged at constant current to 4.0 V at current value of 0.2 C. Thereby, a lithium ion secondary battery for measuring the conductivity was prepared. The evaluation was carried out based on the following standards.

(Decision Criteria)
A: 3.9 Ω·cm or less (extremely good)
B: 4.2 Ω·cm or less (good)
C: more than 4.2 Ω·cm (poor)

TABLE 2

| | Transfer ratio | Resistance | | Adhesion ratio | |
|---|---|---|---|---|---|
| | % | Ω · cm | Evaluation | Edge | Surface |
| Example 1 | 100 | 3.68 | A | 100% | 100% |
| Example 2 | 100 | 3.78 | A | 100% | 100% |
| Example 3 | 100 | 3.85 | A | 100% | 100% |
| Example 4 | 100 | 3.67 | A | 100% | 100% |
| Example 5 | 100 | 4.13 | B | 100% | 100% |
| Comp. Ex. 1 | 60 | 3.78 | A | 100% | 65% |
| Ref. Ex. 1 | 85 | 3.66 | A | 80% | 80% |

From the results shown in Table 2, it was confirmed that, in Examples 1 to 5, the transfer layer may be transferred with improved transfer ratio by using the transfer layer wherein the binder concentration of the surface portion on opposite side to the transfer foil was high. In contrast, it was confirmed that the transfer ratio was lowered when a transfer layer wherein the binder concentration of the surface portion on opposite side to the transfer foil was low, was used as in Comparative Example 1, and when a transfer layer with uniform binder concentration was used as in Reference Example 1. Also, compared to Comparative Example and Reference Example, it was confirmed that the adhesion of the edge and the surface may be improved in Examples 1 to 5. Also, it was confirmed that improved results may be obtained for the resistance of the evaluation batteries in Examples 1 to 5.

REFERENCE SIGNS LIST

1 . . . first active material layer
2 . . . second active material layer
3 . . . solid electrolyte layer
4 . . . first current collector
5 . . . second current collector
6 . . . concentration gradient layer
10 . . . all solid state battery
20 . . . transfer member
21 . . . transfer foil
22 . . . transfer layer

What is claimed is:

1. A method for producing an all solid state battery including a first current collector, a first active material layer, a solid electrolyte layer, a second active material layer and a second current collector stacked in this order, the method comprising:

a transferring step of transferring a transfer layer onto the first current collector by using a transfer member including a transfer foil and the transfer layer, the transferring step being included in a step of forming at least one layer of the first active material layer, the solid electrolyte layer, and the second active material layer, and the transfer layer includes a binder, and in a thickness direction, a binder concentration of a surface portion on opposite side to the transfer foil is higher than a binder concentration of a surface portion on the transfer foil side.

2. The method for producing an all solid state battery according to claim 1, wherein in the transferring step, the transfer layer is transferred onto a transfer receiving layer formed on the first current collector, and the transfer receiving layer includes a binder, and in a thickness direction, a binder concentration of a surface portion on opposite side to the first current collector is higher than a binder concentration of a surface portion on the first current collector side.

3. The method for producing an all solid state battery according to claim 2, wherein the transfer receiving layer is the first active material layer, and the transfer layer is a layer including the solid electrolyte layer as an outermost layer.

4. The method for producing an all solid state battery according to claim 2, wherein the first active material layer is a stacked body including at least two layers or more of active material constituting layers, the transfer receiving layer is a $n^{th}$ active material constituting layer wherein n is an integer of one or more, and the transfer layer is a $(n+1)^{th}$ active material constituting layer.

5. The method for producing an all solid state battery according to claim 1, wherein, in a thickness direction of the transfer layer, when a region from a midportion to a surface portion on the transfer foil side is regarded as a first region and a region from the midportion to a surface portion on opposite side to the transfer foil is regarded as a second region, a proportion of a binder concentration of the second region to a binder concentration of the first region is 105% or more and 190% or less.

\* \* \* \* \*